United States Patent [19]
Reither

[11] Patent Number: 5,692,938
[45] Date of Patent: Dec. 2, 1997

[54] POLYESTER FIBER WITH IMPROVED ABRASION RESISTANCE

[75] Inventor: John R. Reither, Summerville, S.C.

[73] Assignee: Asten, Inc., Charleston, S.C.

[21] Appl. No.: 771,245

[22] Filed: Dec. 20, 1996

[51] Int. Cl.$^6$ .......................... B32B 27/00; D03D 23/00; C08F 20/00
[52] U.S. Cl. .................. 442/199; 442/301; 139/383 A; 162/902; 525/444
[58] Field of Search ........................ 442/199, 301; 139/383 A; 162/902; 523/444

[56] References Cited

U.S. PATENT DOCUMENTS

| | | | |
|---|---|---|---|
| 3,761,348 | 9/1973 | Chamberlin | 161/173 |
| 4,663,423 | 5/1987 | Yamada et al. | 528/179 |
| 4,666,764 | 5/1987 | Kobayashi et al. | 428/254 |
| 4,975,326 | 12/1990 | Buyalos et al. | 428/373 |
| 5,169,711 | 12/1992 | Bhatt et al. | 428/257 |

OTHER PUBLICATIONS

Hong et al., Rheological and Physical Properties of Polyarylate/LCP Blend Systems, Polymer Engineering and Science, May 1993, vol. 33, No. 10, pp. 630–638.

Mehta et al., Fibers From Blends of PET and Thermotropic Liquid Crystalline Polymer, Polymer Engineering and Science, Jul. 1993, vol. 33, No. 14, pp. 931–936.

Verhoogt et al., Blends of a Thermotropic LCP and a Thermoplastic Elastomer. II: Formation and Stability of LCP Fibers, Polymer Engineering and Science, Mid–Mar. 1994, vol. 34, No. 5, pp. 453–460.

Mantia et al., Nonisothermal Elongational Behavior of Blends With Liquid Crystalline Polymers, Polymer Engineering and Science, May 1994, vol. 34, No. 10, pp. 799–803.

*Primary Examiner*—Newton Edwards
*Attorney, Agent, or Firm*—Volpe and Koenig, P.C.

[57] ABSTRACT

Papermaking fabrics comprising monofilaments of blended polyethylene terephthalate (PET) and liquid crystalline polymer (LCP). The monofilaments are particularly useful in forming and dryer fabrics. The papermaking fabrics have significantly improved abrasion resistance characteristics over fabrics comprising monofilaments of pure PET.

11 Claims, 1 Drawing Sheet

POLYESTER FIBER WITH IMPROVED ABRASION RESISTANCE

BACKGROUND OF THE INVENTION

The present invention relates to monofilaments which contain a polymer of polyethylene terephthalate (PET) and liquid crystalline polymer (LCP). These monofilaments have improved abrasion resistance and are suited for use in papermaking fabrics. The monofilaments are particularly suitable for use in papermaking fabrics used in the forming and dryer sections.

1. Field of the Invention

Papermaking machines use fabrics which may be forming fabrics, press felts or dryer fabrics according to the function performed in the papermaking process. The design and composition of papermaking fabrics used on each section of the papermaking machines varies in accordance with function.

The papermaking process starts in the forming section of the papermaking machine where aqueous pulp slurry is deposited onto a forming fabric having desired characteristics for retaining the fibers while allowing the water to pass through to the fabric. The aqueous paper web created by this process is then transferred to and carried by a press felt through the press section where additional water is removed by conveying the paper web through one or more press nips. The paper web is then transferred to and carried through the drying section of the dryer fabric to remove additional water through forced evaporation.

Monofilament fabrics must withstand the adverse environment in the papermaking process. In the forming section of the papermaking process, the fabrics are subjected to changes in temperature, compression and elongation forces, and abrasive chemicals. In the dryer section of the papermaking process, the fabrics must withstand moist and dry heat. The forming and dryer fabrics are in contact with the aqueous paper sheet on one side and the papermaking machine on the other side. Accordingly, forming and dryer fabrics desirably must possess several characteristics to function properly in this environment.

Forming fabrics must have a mesh weave that is fine enough to separate the fiber from the slurry yet avoid marking the paper. The forming fabric must also be open enough to have good drainage for the initial water removal that facilitates paper formation and it must be resistant to degradation resulting from exposure to chemicals in the paper furnish in the forming section of the papermaking machines. Furthermore, the forming fabric must withstand high tensile loads in the machine direction and compressive buckling loads in the cross-machine direction.

Dryer fabrics must have enough permeability to allow the passage of vapor through the fabric. The fabric must be resistant to degradation from moist and dry heat. Additionally, the dryer fabric must permit uniform and measured drying of the paper sheet.

Forming fabrics and dryer fabrics must be abrasion resistant to withstand both the continuous papermaking machine and paper sheet contact during the papermaking process. They must be structurally stable to support the paper sheet while stress forces are placed on it during use. The fabrics must resist stretch under the tension imposed by the powered rolls which drive the fabric.

2. Description of the Prior Art

Prominent monofilaments used in papermaking forming fabrics include polyester, particularly polyethylene terephthalate (PET). It is known in the art to blend these PET polymers with other polymers, such as polyethylene or polybutylene terephthalate, to vary the characteristics of the resulting monofilaments.

Polyethylene terephthalate (PET), an aliphatic-aromatic polymer, is known to exhibit good chemical and dimensional stability, acceptable weaving characteristics, such as tensile strength and loop strength, low moisture gain, good crimpability and heat setting properties. However, PET monofilaments do not have good abrasion resistance, especially at higher speeds, and are known to degrade when exposed to harsh chemical environments for significant periods of time. Stabilizing additives and stabilization techniques may extend the useful life of the PET for a relatively short period of time. Typically, the PET monofilaments degrade and require replacement in about thirty to sixty days.

Liquid Crystalline Polymers (LCP) are polymers which retain a high degree of crystalline order when in a melt phase. LCPs are composed of long and slender molecules and readily orient in the direction of material flow. As the LCP solidifies, the molecule orientation is maintained.

P-hydroxy benzoic acid is a known copolymer in certain LCP compositions. Additionally, p-hydroxy benzoic acid and similar compounds are disclosed as a copolymer in several patents. U.S. Pat. No. 4,663,423 (Yamada et al.) discloses p-hydroxy benzoic acid as a copolymer with terephthalic acid. U.S. Pat. No. 4,666,764 (Kobayashi et al.) discloses a water-repellent anti-static fabric composed of terephthalic acid and naphthalenedicarboxylic acid or hydroxyethoxy benzoic acid and p-hydroxy benzoic acid copolymer. U.S. Pat. No. 4,975,326 (Buyalos et al.) discloses PET with minor amounts of bibenzoic acid copolymer.

Mixtures of PET with LCP are discussed in Nonisothermal *Elongational Behavior of Blends with Liquid Crystalline Polymers*, Polymer Engineering and Science, May 1994, Vol. 34, No. 10, pp. 799–803. Although the article discusses a broad range of proportions in PET/LCP blends, it is silent about abrasion resistance or defined proportions of LCP which are operable in papermaking fabrics.

Although these references disclose various combinations of chemical compositions, they do not recognize the advantages of using a LCP based polymer as a blend with PET for making monofilaments used in papermaking fabrics.

SUMMARY OF THE INVENTION

The present invention concerns PET/LCP blended monofilaments which are particularly suitable for use in papermaking machine fabrics. The monofilaments of PET blended with LCP provide improved abrasion resistance. This is a particularly desirable characteristic for monofilaments used in papermaking forming and dryer fabrics.

The monofilaments of the present invention can be woven into papermaking fabrics according to conventional weaving techniques. The type and density of the weave will depend on the type of paper and papermaking operation for which the fabric is to be used. The PET/LCP based monofilaments may be interwoven with monofilaments containing other chemical compositions.

DESCRIPTION OF THE PREFERRED EMBODIMENTS

Figure 1:
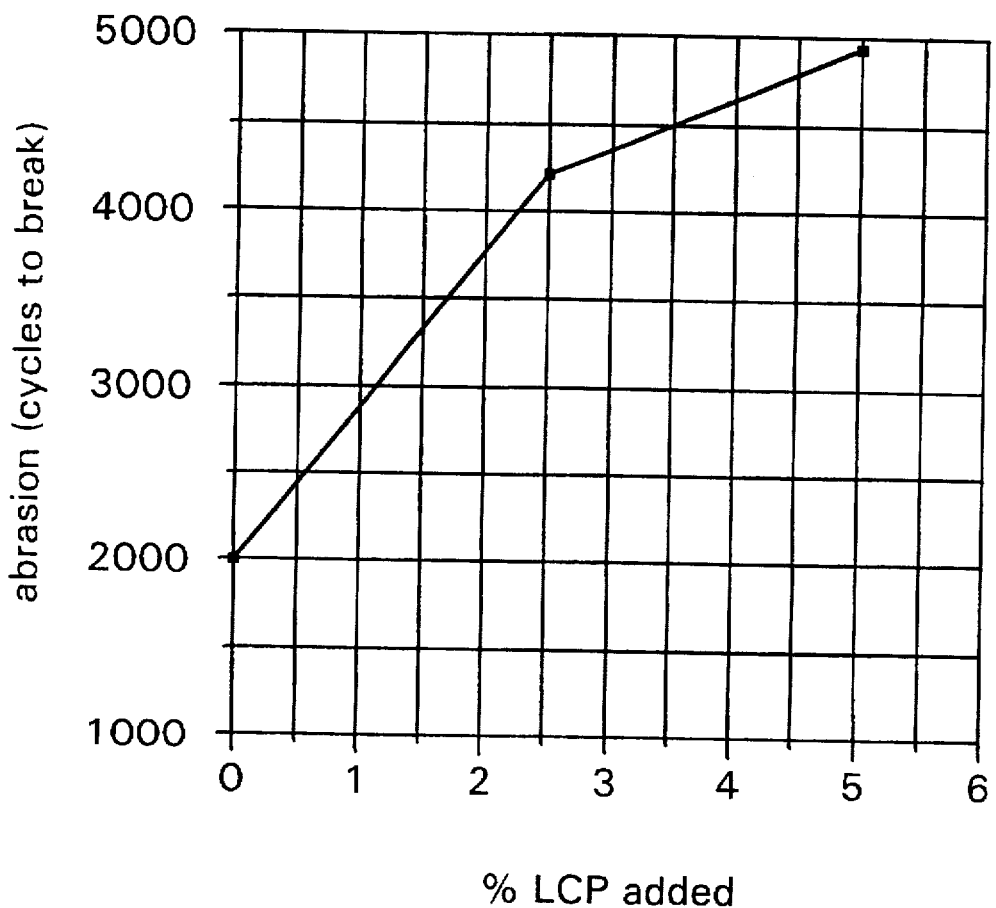
FIG. 1 is a graph showing abrasion resistance improvements of PET with increased amounts of LCP according to the present invention.

This invention relates to monofilaments which contain blended polyethylene terephthalate and liquid crystalline polymer. The high degree of crystalline orientation of the LCP is believed to enhance the abrasion resistance in blends with PET. Acceptable LCPs must have a temperature range compatible with PET and be extrudable. In the preferred embodiment, the LCP component of these monofilament blends is made from 6-hydroxy-2-naphthoic acid and p-hydroxy benzoic acid.

FIG. 1 shows increased fabric abrasion resistance of PET as it is blended with increasing amounts of LCP. As seen in FIG. 1., monofilaments of pure PET have an abrasion resistance of 2000 cycles per break. With a blend of 97.5% PET and 2.5% LCP, the abrasion resistance is 4214. When PET is blended with LCP in a proportion of 95%/5%, the abrasion resistance is 4950. Abrasion resistance of PET significantly improves with blended amounts of 1–10% LCP.

The following examples 1–16 use varying amounts of blended PET and LCP manufactured according to the parameters listed in tables 1–4. The particular grades of PET and LCP within these tests were grouped for comparison as examples 1–5, 6–9, 10–12, and 13–16.

EXAMPLES 1–5

In examples 1–5, monofilaments of PET blended with varying amounts of LCP were compared. The PET was a low molecular weight PET resin of IV=0.74, made by Hoechst-Celanese, under the trade name T-26. The PET was mixed with 0, 5, 5, 10 and 25 percent weight of LCP. The LCP was made by Hoechst-Celanese, under the trademark VECTRA™ A950. The LCP was composed of 73 mole percent of p-hydroxy benzoic acid and 27 mole percent of 6-hydroxy-2-naphthoic acid. The formed monofilaments were 0.25 to 0.3 mm in diameter. The monofilaments were tested for abrasion resistance and/or breaking strength.

EXAMPLE 1

Monofilaments of pure polyethylene terephthalate were prepared in accordance with the specified parameters of Table 1. The abrasion resistance was 3831 and 3270 cycles per break.

EXAMPLE 2

A monofilament was produced by blending 95% polyethylene terephthalate and 5% liquid crystalline polymer in accordance with the specified parameters of Table 1. The monofilament was extremely brittle and abrasion resistance testing was not performed. The breaking strength of the monofilament was 2.951 grams per denier.

TABLE 1

| Example | 1 | 2 | 3 | 4 | 5 |
| --- | --- | --- | --- | --- | --- |
| Pump (cm³/min.) | 110 | 110 | 110 | 110 | 110 |
| Barrel Zone 1 (°F.) | 551.1 | 549.1 | 549.8 | 549.8 | 549.8 |
| Barrel Zone 2 (°F.) | 550.4 | 549.1 | 549.8 | 549.8 | 549.8 |
| Barrel Zone 3 (°F.) | 550.4 | 549.8 | 549.8 | 549.1 | 549.1 |
| Barrel Zone 4 (°F.) | 551.8 | 549.1 | 549.8 | 550.4 | 549.8 |
| Flange (°F.) | 553.1 | 547.7 | 549.1 | 550.4 | 549.8 |
| Spinhead 6 (°F.) | 551.8 | 549.1 | 551.8 | 550.4 | 549.8 |
| Spinhead 7 (°F.) | 550.4 | 549.8 | 550.4 | 550.4 | 549.8 |

TABLE 1-continued

| Example | 1 | 2 | 3 | 4 | 5 |
| --- | --- | --- | --- | --- | --- |
| Spinhead 8 (°F.) | 552.4 | 552.4 | 551.1 | 549.8 | 549.8 |
| Spinhead 9 (°F.) | 550.4 | 549.1 | 548.4 | 546.4 | 544.4 |
| Spinhead 10 (°F.) | 551.1 | 549.8 | 549.8 | 549.8 | 549.1 |
| Godet 1 (fpm) | 43 | 43 | 43 | 40 | 37.5 |
| Godet 2 (fpm) | 193 | 172 | 172 | 172 | 172 |
| Godet 3 (fpm) | 216 | 200 | 200 | 200 | 200 |
| Godet 4 (fpm) | 183.8 | 172 | 184 | 184 | 184 |
| Oven 1 (°F.) | 241.5 | 300.1 | 299.6 | 320.2 | 320.2 |
| Oven 2 (°F.) | 380.3 | 375.6 | 374.5 | 374.5 | 375.1 |
| Oven 3 (°F.) | 459 | 449.5 | 424.7 | 424.7 | 425.7 |
| Pump A | 57.3 | 60.9 | 57.3 | 56 | 58.5 |
| Pump S (cm³/min.) | 109.9 | 109.9 | 109.9 | 109.9 | 109.9 |
| Extruder (Amp) | 38 | 38.8 | 35.9 | 37.1 | 37.6 |
| Screw speed | 42.9 | 42.9 | 45.0 | 42.6 | 43.7 |
| Pressure 1 (psi) | 2316 | 2409 | 2546 | 2414 | 2448 |
| Pressure 2 (psi) | 997 | 987 | 987 | 1006 | 992 |
| Pressure 4 (psi) | 219 | 215 | 210 | 215 | 215 |
| Quench Bath (°F.) | 150.6 | 149.7 | 149.8 | 150 | 149.8 |
| Air Gap | 2" | 2" | 2" | 2" | 2" |
| Melt (°F.) | — | — | 568.6 | 567.3 | 566.6 |
| LCP (% weight) | 0 | 5 | 5 | 10 | 25 |
| Abrasions (cycles/break) | 3831/ 3270 | — | 1948/ 1956 | 1924/ 1973 | — |

EXAMPLE 3

A monofilament was produced by blending 95% polyethylene terephthalate and 5% liquid crystalline polymer in accordance with the specified parameters of Table 1. The breaking strength was 3.183 grams per denier. The abrasion resistance was 1948 and 1956 cycles per break.

EXAMPLE 4

A monofilament was produced by blending 90% polyethylene terephthalate and 10% liquid crystalline polymer in accordance with the specified parameters of Table 1. Breaking strength was 3.796 grams per denier. The abrasion resistance was 1924 and 1973 cycles per break.

EXAMPLE 5

A monofilament was produced by blending 75% polyethylene terephthalate and 25% liquid crystalline polymer in accordance with the specified parameters of Table 1. The monofilament broke before abrasion resistance measurements were performed.

Examples 1–5 used a lower molecular weight PET (IV= 0.74). The breaking strength of the monofilament of example 2 was low at 2.951 grams per denier. In example 3, the abrasion resistance of 1948 and 1956 cycles per break was significantly less than pure PET monofilaments with an abrasion resistance of 3831 and 3270 cycles per break. The breaking strength in example 3 also was low at 3.183 grams per denier. In example 4, the abrasion resistance of 1924 and 1973 cycles per break was significantly less than pure PET monofilaments. Although the breaking strength was higher for the monofilament of example 4 than the monofilament of example 3, it was low at 3.796 grams per denier. These runs show no significant improvement in mechanical properties or abrasion resistance of the blended PET/LCP monofilaments over 100% PET monofilaments.

EXAMPLES 6–9

In examples 6–9, additional monofilaments of PET blended with varying amounts of LCP were compared. The PET was a higher molecular weight PET resin than for examples 1–5, with an IV=0.95 (m.w.=26,336), made by Shell, under the trademark VITUF™ 9501. The PET was mixed with 0, 5, 5 and 10 percent weight of LCP. The LCP was produced by Hoechst-Celanese, under the trademark VECTRA™ A950. Several abrasion resistance measurements were made for the formed monofilaments, which were averaged for the measurements listed in examples 6–9. The monofilaments were 0.25 to 0.3 mm in diameter.

EXAMPLE 6

A monofilament of pure polyethylene terephthalate was produced in accordance with the parameters set forth in Table 2. The abrasion resistance averaged 2163.

EXAMPLE 7

A monofilament of 95% PET was mixed with 5% LCP in accordance with the parameters set forth in Table 2. The abrasion resistance averaged 5290. The breaking strength was 5.086 grams per denier.

EXAMPLE 8

A monofilament of 95% PET was mixed with 5% LCP in accordance with the parameters set forth in Table 2. The abrasion resistance averaged 4789.

EXAMPLE 9

A monofilament of 90% PET was mixed with 10% LCP in accordance with the parameters set forth in Table 2. The monofilament broke easily and no abrasion resistance measurements were obtained.

TABLE 2

| Example | 6 | 7 | 8 | 9 |
| --- | --- | --- | --- | --- |
| Pump (cm³/min.) | 70 | 70 | 70 | 70 |
| Barrel Zone 1 (°F.) | 561.2 | 559.8 | 559.8 | 559.8 |
| Barrel Zone 2 (°F.) | 575.3 | 574.6 | 575.3 | 575.3 |
| Barrel Zone 3 (°F.) | 549.8 | 550.4 | 549.8 | 550.4 |
| Barrel Zone 4 (°F.) | 541.0 | 538.3 | 538.3 | 541.0 |
| Flange (°F.) | 580.7 | 578.0 | 578.9 | 578.0 |
| Spinhead 6 (°F.) | 539.7 | 540.3 | 540.3 | 540.3 |
| Spinhead 7 (°F.) | 540.3 | 539.7 | 539.7 | 540.3 |
| Spinhead 8 (°F.) | 574.6 | 574.6 | 574.6 | 574.6 |
| Spinhead 9 (°F.) | 574.6 | 574.6 | 574.6 | 574.6 |
| Spinhead 10 (°F.) | 574.0 | 574.6 | 574.0 | 574.6 |
| Godet 1 (fpm) | 40 | 40 | 45 | 45 |
| Godet 2 (fpm) | 172 | 172 | 172 | 170 |
| Godet 3 (fpm) | 200 | 200 | 200 | 121 |
| Godet 4 (fpm) | 184 | 184 | 184 | 120 |
| Oven 1 (°F.) | 248.4 | 249.4 | 249.4 | 300.1 |
| Oven 2 (°F.) | 369.8 | 379.3 | 379.3 | 380.3 |
| Oven 3 (°F.) | 444.7 | 449.5 | 450.5 | 449.0 |
| Pump A | 53.6 | 52.4 | 52.4 | 59.7 |
| Pump S (cm³/min.) | 69.9 | 69.9 | 69.9 | 69.9 |
| Extruder (Amp) | 41.2 | 40 | 43.7 | 41.6 |
| Screw speed | 21.2 | 23.5 | 24.0 | 25.7 |
| Pressure 1 (psi) | 1788 | 1520 | 1475 | 1127 |
| Pressure 2 (psi) | 1480 | 1285 | 1275 | 941 |
| Pressure 4 (psi) | 78 | 73 | 68 | 53 |
| Quench Bath (°F.) | 139.6 | 152.3 | 151.1 | 151.0 |
| Air Gap | 1" | 1" | 1" | 1" |
| Melt (°F.) | 602 | 605.6 | 605.6 | 609.6 |
| LCP (% weight) | 0 | 5 | 5 | 10 |
| Abrasions (cycles/break) | 2163 | 5290 | 4789 | — |

Examples 6–9 used a high molecular weight PET, PET-9501 resin, with 0, 5, 5, and 10 percent weight LCP. At 0% LCP, the abrasion resistance was 2163 cycles per break. When LCP was blended at 5%, the abrasion resistance was 5290 and 4789 cycles per break. However, at 10% LCP, the monofilaments became extremely brittle. Significant improvement was seen in the mechanical properties and abrasion resistance in monofilaments of 1–10% LCP blended with high molecular weight PET.

EXAMPLES 10–12

In examples 10–12, additional monofilaments of PET blended with varying amounts of LCP were compared. The PET was made by Shell, under the trademark VITUF™ 9501. The PET was mixed with 2, 4, and 6 percent weight of LCP. The LCP was produced by Hoechst-Celanese, under the trademark VECTRA™ A950. The resulting monofilaments were tested for abrasion resistance. The monofilaments were approximately 0.4 mm in diameter.

EXAMPLE 10

98% polyethylene terephthalate was blended with 2% liquid crystalline polymer in accordance with the parameters set forth in Table 3. The abrasion resistance averaged 2642 cycles per break.

EXAMPLE 11

96% polyethylene terephthalate was blended with 4% liquid crystalline polymer in accordance with the parameters set forth in Table 3. The abrasion resistance averaged 3186 cycles per break.

EXAMPLE 12

94% polyethylene terephthalate was blended with 6% liquid crystalline polymer in accordance with the parameters set forth in Table 3. The abrasion resistance averaged 3176 cycles per break.

In addition to examples 10–12, the PET was extruded into a monofilament with 0 percent weight LCP. Abrasion resistance averaged 2063.

Examples 10–12 were run at 98/2, 96/4 and 94/6 percent weight PET/LCP blended compositions. At 2% LCP, the abrasion resistance averaged 2642. At 4% LCP, the abrasion resistance was 3186 and at 6% LCP the abrasion resistance was 3176. The pure PET monofilament had an abrasion resistance average of 2063. The abrasion resistance improved significantly with the addition of LCP, but formed a plateau at 4%–6% LCP.

EXAMPLES 13–16

Examples 13–16 compare blended monofilaments of PET with varying amounts of LCP and a fluoropolymer. The PET was made by Shell, under the trademark VITUF™ 9501. The LCP was produced by Hoechst-Celanese, under the trademark VECTRA™ A950. The fluoropolymer was a pellet ethylene tetrafluoroethylene copolymer sold under the trademark TEFZEL™ 210, produced by E. I. dupont de Nemours & Co., of Wilmington, Del. The monofilaments were formed from blends of PET/fluoropolymer/LCP in proportions of 100/0/0, 95/5/0, 93/5/2 and 91/5/4 percent weight.

TABLE 3

| Example | 10 | 11 | 12 |
| --- | --- | --- | --- |
| Pump (cm³/min.) | 75 | 75 | 75 |
| Barrel Zone 1 (°F.) | 559.2 | 560.5 | 559.8 |
| Barrel Zone 2 (°F.) | 574.0 | 574.6 | 574.6 |

TABLE 3-continued

| Example | 10 | 11 | 12 |
| --- | --- | --- | --- |
| Barrel Zone 3 (°F.) | 549.8 | 549.8 | 549.8 |
| Barrel Zone 4 (°F.) | 540.3 | 540.3 | 538.3 |
| Spinhead 6 (°F.) | 549.8 | 549.8 | 550.4 |
| Spinhead 7 (°F.) | 550.4 | 548.4 | 549.8 |
| Spinhead 8 (°F.) | 574.6 | 574 | 574.6 |
| Spinhead 9 (°F.) | 547.6 | 574.6 | 574.6 |
| Spinhead 10 (°F.) | 575.3 | 574.6 | 574.6 |
| Godet 1 (fpm) | 40 | 40 | 47.5 |
| Godet 2 (fpm) | 172 | 172 | 172 |
| Godet 3 (fpm) | 200 | 200 | 200 |
| Godet 4 (fpm) | 184 | 184 | 184 |
| Oven 1 (°F.) | 249.4 | 249.4 | 249.4 |
| Oven 2 (°F.) | 379.3 | 379.3 | 380.3 |
| Oven 3 (°F.) | 450 | 449.5 | 449.0 |
| Pump A | 52.4 | 51.2 | 59.7 |
| Pump S (cm³/min.) | 75.0 | 75 | 75 |
| Extruder (Amp) | 38.8 | 40.4 | 38.8 |
| Screw speed | 24.0 | 24.3 | 26.2 |
| Pressure 1 (psi) | 1837 | 1568 | 1901 |
| Pressure 2 (psi) | 679 | 576 | 1055 |
| Pressure 4 (psi) | 39 | 39 | 0 |
| Quench Bath (°F.) | 140.2 | 150.6 | 150 |
| Air Gap | 1" | 1" | 1" |
| LCP (% weight) | 2 | 4 | 6 |
| Abrasions (cycles/break) | 2642 | 3186 | 3176 |

EXAMPLE 13

Polyethylene terephthalate was formed into a monofilament in accordance with the parameters set forth in Table 4. No LCP or TEFZEL™ was included in the monofilament. Abrasion resistance was measured at 2105 cycles per break.

EXAMPLE 14

93% PET was blended with 5% TEFZEL™ and 2% LCP in accordance with the parameters set forth in Table 4. Abrasion resistance was measured at 2781.

EXAMPLE 15

91% PET was blended with 5% TEFZEL™ and 4% LCP in accordance with the parameters set forth in Table 4. Abrasion resistance was measured at 3020.

EXAMPLE 16

95% PET was blended with 58 TEFZEL™ and yielded an abrasion resistance of 2626.

As seen in examples 13–16, the addition of TEFZEL™ did not confer any significant advantage to the abrasion resistance over non-fluouropolymer blends when used in combination with LCP blended with PET. At 95% PET and 5% TEFZEL™, the abrasion resistance was 2626. When 5% TEFZEL™ and 2% LCP were blended with 93% PET, the abrasion resistance was 2781. At 91% PET, 58 TEFZEL™ and 4% LCP, the abrasion resistance was 3020. The monofilaments of examples 7 and 8, with 95% PET and 5% LCP, had an abrasion resistance of 5290 and 4789, respectively.

TABLE 4

| Example | 13 | 14 | 15 |
| --- | --- | --- | --- |
| Pump (cm³/min.) | 70 | 70 | 70 |
| Barrel Zone 1 (°F.) | 549.8 | 549.8 | 551.1 |
| Barrel Zone 2 (°F.) | 574.6 | 574.6 | 575.3 |
| Barrel Zone 3 (°F.) | 549.8 | 550.4 | 549.8 |
| Barrel Zone 4 (°F.) | 537.0 | 535.6 | 539.0 |
| Spinhead 6 (°F.) | 540.3 | 539.0 | 540.3 |
| Spinhead 7 (°F.) | 539.7 | 539.7 | 540.3 |
| Spinhead 8 (°F.) | 574.6 | 574.6 | 574.6 |
| Spinhead 9 (°F.) | 574.6 | 574.6 | 574.6 |
| Spinhead 10 (°F.) | 574.6 | 574.6 | 574.6 |
| Godet 1 (fpm) | 40 | 47.5 | 47.5 |
| Godet 2 (fpm) | 172 | 172 | 172 |
| Godet 3 (fpm) | 200 | 200 | 200 |
| Godet 4 (fpm) | 184 | 184 | 184 |
| Oven 1 (°F.) | 249.4 | 249.4 | 248.9 |
| Oven 2 (°F.) | 380.9 | 379.8 | 379.8 |
| Oven 3 (°F.) | 450.0 | 449.0 | 449.5 |
| Pump A | 56 | 49.9 | 47.5 |
| Pump S (cm³/min.) | 69.9 | 69.9 | 69.9 |
| Extruder A | 41.6 | 40.4 | 37.6 |
| Extruder S | 22.9 | 22.4 | 23 |
| Pressure 1 (psi) | 2443 | 1217 | 1153 |
| Pressure 2 (psi) | 2712 | 1388 | 1231 |
| Pressure 4 (psi) | — | — | — |
| Quench Bath (°F.) | 149.5 | 149.7 | 150.2 |
| Air Gap | 1" | 1" | 1" |
| LCP/TEFZEL ™ (% weight) | 0/0 | 2/5 | 4/5 |
| Abrasions (cycles/break) | 2105 | 2781 | 3020 |

Industrial Monofilaments

Industrial monofilaments were produced for a paper forming fabric. The monofilaments were made at 2.5% and 5% LCP blended with 97.5% and 95% PET, respectively. The PET was made by Shell under the trademark VITUF™ 9504, with an IV=0.95 (m.w.=26.336). The LCP was produced by Hoechst-Celanese, under the trademark VECTRA™ A950.

TABLE 5

| Example | Industrial Monofilament 1 | Industrial Monofilament 2 |
| --- | --- | --- |
| Barrel Zone 1 (°F.) | 540.1 | 540.1 |
| Barrel Zone 2 (°F.) | 540.0 | 540.1 |
| Barrel Zone 3 (°F.) | 540.5 | 540.3 |
| Barrel Zone 4 (°F.) | 540.3 | 540.5 |
| Spinhead 6 (°F.) | 529.4 | 530.0 |
| Spinhead 7 (°F.) | 530.0 | 530.2 |
| Spinhead 8 (°F.) | 550.0 | 549.3 |
| Spinhead 9 (°F.) | 557.9 | 557.7 |
| Spinhead 10 (°F.) | 550.1 | 550.1 |
| Godet 1 (fpm) | 80.0 | 80.0 |
| Godet 2 (fpm) | 377.4 | 377.4 |
| Godet 3 (fpm) | 422.7 | 422.7 |
| Godet 4 (fpm) | 398.7 | 398.7 |
| Oven 1 (°F.) | 260.1 | 260.1 |
| Oven 2 (°F.) | 350.1 | 349.8 |
| Oven 3 (°F.) | 490.0 | 490.8 |
| Pump A | 67.1 | 66.4 |
| Pump S (cm³/min.) | 350.0 | 350.0 |
| Extruder A | 30.4 | 29.7 |
| Pressure 1 (psi) | 1815 | 1956 |
| Pressure 2 (psi) | 1484 | 1509 |
| Pressure 3 (psi) | 754 | 737 |
| Pressure 4 (psi) | 701 | 682 |
| LCP (% weight) | 2.5 | 5.0 |
| Abrasions (cycles/break) | 4214 | 4950 |

Industrial Monofilament 1

A first industrial monofilament was made of 97.5% PET and 2.5% LCP in accordance with the parameters set forth in table 5. The abrasion resistance was 4214 cycles per break. Breaking strength averaged 5.313 grams per denier.

Industrial Monofilament 2

A second industrial monofilament was made of 95% PET and 5% LCP in accordance with the parameters set forth in table 5. The abrasion resistance was 4950 cycles per break. The breaking strength averaged 5.369 grams per denier.

Comparison Monofilament

An industrial monofilament of 100% PET was made. The abrasion resistance was 2000 cycle per break.

The industrial monofilaments with 2.5% LCP and 5% LCP show an excellent abrasion resistance of 4214 and 4950 cycles per break, respectively. Additionally, the monofilament of 2.5% LCP and 5% LCP have breaking strengths of 5.313 and 5.194, respectively. Orientation of the LCP appears to conform easily within the spinneret at the given temperatures of the process to make industrial monofilaments. The mechanical properties were excellent and abrasion resistance significantly improved with the addition of 2.5% LCP and 5% LCP over the pure PET monofilament.

The foregoing examples illustrate particular embodiments of the invention and provide monofilaments suitable for use in papermaking fabrics, particularly forming and dryer fabrics, and are not intended to limit the scope of the invention.

What is claimed is:

1. A papermaking fabric having improved abrasion resistance including monofilaments of approximately 100 percent weight of a combination of polyethylene terephthalate and liquid crystalline polymer.

2. The papermaking fabric according to claim 1 wherein the liquid crystalline polymer is present in an amount of about 1 percent weight to about 10 percent weight.

3. The papermaking fabric according to claim 2 wherein the liquid crystalline polymer is present in an amount of about 2.5 percent weight to about 6 percent weight.

4. The papermaking fabric according to claim 3 wherein the liquid crystalline polymer is present in an amount of about 4 percent weight to about 6 percent weight.

5. The papermaking fabric according to claim 1 wherein the liquid crystalline polymer comprises 6-hydroxy-2-naphthoic acid and p-hydroxy benzoic acid.

6. The papermaking fabric according to claim 5 wherein the liquid crystalline polymer is composed of about 60 to about 80 mole percent 6-hydroxy-2-naphthoic acid and about 20 to about 40 mole percent p-hydroxy benzoic acid.

7. The papermaking fabric according to claim 6 wherein the liquid crystalline polymer is composed of about 70 mole percent 6-hydroxy-2-naphthoic acid and from about 30 mole percent p-hydroxy benzoic acid.

8. The papermaking fabric according to claim 1 wherein the monofilaments are melt extruded.

9. The papermaking fabric according to claim 1 wherein the fabric is a papermaking forming fabric.

10. The papermaking fabric according to claim 1 wherein the fabric is a papermaking dryer fabric.

11. A papermaking fabric having improved abrasion resistance including monofilaments consisting essentially of approximately 100 percent weight of a combination of polyethylene terephthalate and liquid crystalline polymer.

* * * * *

UNITED STATES PATENT AND TRADEMARK OFFICE
CERTIFICATE OF CORRECTION

PATENT NO. : 5,692,938

DATED : December 2, 1997

INVENTOR(S) : Jolhn R. Reither

It is certified that error appears in the above-indentified patent and that said Letters Patent is hereby corrected as shown below:

On the title page: Item [56] Reference Cited: please insert the following:

| | | | |
|---|---|---|---|
| 4,408,022 | 10/83 | Cincotta et al. | 525/444 |
| 4,451,611 | 5/84 | Cincotta et al. | 525/444 |
| 4,468,364 | 8/84 | Ide | 264/176R |
| 4,489,190 | 12/84 | Froix | 525/444 |
| 4,983,688 | 1/91 | Jennings et al. | 525/389 |
| 5,032,433 | 7/91 | Isayev et al. | 428/1 |

UNITED STATES PATENT AND TRADEMARK OFFICE
CERTIFICATE OF CORRECTION

PATENT NO. : 5,692,938
DATED : December 2, 1997
INVENTOR(S) : John R. Reither

It is certified that error appears in the above-indentified patent and that said Letters Patent is hereby corrected as shown below:

At column 7, line 46, after numeral "5" delete "8" and insert --%-- therefor.

At column 7, line 55, after numeral "5" delete "8" and insert --%-- therefor.

Signed and Sealed this

Eighteenth Day of August, 1998

Attest:

BRUCE LEHMAN

Attesting Officer

Commissioner of Patents and Trademarks